United States Patent [19]

Braun et al.

[11] Patent Number: 5,078,132
[45] Date of Patent: Jan. 7, 1992

[54] BONDED ADSORBENT STRUCTURES AND RESPIRATORS INCORPORATING SAME

[75] Inventors: David L. Braun, Lake Elmo; Peter O. Rekow, Lauderdale, both of Minn.

[73] Assignee: Minnesota Mining and Manufacturing Company, St. Paul, Minn.

[21] Appl. No.: 692,238

[22] Filed: Apr. 26, 1991

Related U.S. Application Data

[60] Division of Ser. No. 364,484, Jun. 8, 1989, which is a continuation of Ser. No. 770,075, Aug. 28, 1985, abandoned.

[51] Int. Cl.[5] .................... A62B 7/10; A62B 18/08; A62B 23/02; A62B 18/02
[52] U.S. Cl. .................... 128/206.12; 128/205.29; 128/206.21; 128/206.19
[58] Field of Search .................. 128/205.27, 205.28, 128/205.29, 206.12, 206.19, 206.21, 206.28

[56] References Cited

U.S. PATENT DOCUMENTS

| | | | |
|---|---|---|---|
| Re. 29,501 | 12/1977 | Lapidus | 36/44 |
| 3,091,550 | 5/1963 | Doying | 117/76 |
| 3,217,715 | 11/1965 | Berger et al. | 131/10 |
| 3,353,547 | 11/1967 | Fordyce et al. | 131/267 |
| 3,354,886 | 11/1967 | Berger et al. | 131/10.9 |
| 3,378,933 | 4/1968 | Rodman | 210/502 |
| 3,474,600 | 10/1969 | Toblon | 55/524 |
| 3,544,507 | 12/1970 | Lloyd | 200/34 |
| 3,588,020 | 12/1970 | Haskell et al. | 210/496 |
| 3,645,072 | 2/1972 | Clapham | 55/367 |
| 3,721,072 | 3/1973 | Clapham | 55/387 |
| 3,813,347 | 5/1974 | Hayes | 252/428 |
| 3,919,369 | 11/1975 | Holden | 55/387 |
| 3,971,373 | 7/1976 | Braun | 128/206.19 |
| 4,046,939 | 9/1977 | Hart | 428/311 |
| 4,061,807 | 12/1977 | Shaler et al. | 428/36 |
| 4,261,832 | 4/1981 | Schumacher et al. | 210/500.2 |
| 4,383,956 | 5/1983 | Croft et al. | 264/49 |
| 4,386,947 | 6/1983 | Mizuno et al. | 55/387 |
| 4,643,182 | 2/1987 | Klein | 128/206.19 |
| 4,664,683 | 5/1987 | Degen et al. | 55/524 |
| 4,665,050 | 5/1987 | Degen et al. | 55/524 |

FOREIGN PATENT DOCUMENTS

| | | |
|---|---|---|
| 0159696 | 10/1985 | European Pat. Off. |
| 6410187 | 3/1965 | Netherlands |
| 1390668 | 6/1972 | United Kingdom |
| 2163064 | 2/1986 | United Kingdom |

Primary Examiner—Edgar S. Burr
Assistant Examiner—Kimberly L. Asher
Attorney, Agent, or Firm—Gary L. Griswold; Walter N. Kirn; Eloise J. Maki

[57] ABSTRACT

Shaped porous filtering structures of substantially uniform thickness and density particularly suited for filtration of gases and vapors comprising spaced adsorbent granules unified into a solid, self-sustaining, unitary, impact-resistant body by adherent binder particles, respirators incorporating such structures as the gas and vapor filtration elements and methods for making the shaped porous filtering structures are disclosed.

19 Claims, 3 Drawing Sheets

BONDED ADSORBENT STRUCTURES AND RESPIRATORS INCORPORATING SAME

This application is a division of U.S. Ser. No. 07/364,484, filed June 8, 1989, still pending, which is a continuation of U.S. Ser. No. 06/770,075, filed Aug. 28, 1985, now abandoned.

BACKGROUND OF THE INVENTION

The present invention relates to bonded adsorbent structures particularly suited for filtration of gases and vapors and respirators incorporating such bonded adsorbent structures as the active gas and vapor filtration elements. The bonded adsorbent structures are of substantially uniform thickness and density throughout resulting in uniformity of air flow therethrough.

Adsorbent structures have long been used for the filtration of fluids and some forms have been specifically developed for use in gas and vapor respirators. These known structures are generally classified according to the manner in which the adsorbent material is supported and include (a) packed beds, (b) loaded nonwovens, (c) loaded foams and (d) bonded adsorbents.

Of these known adsorbent structures, only the packed beds have been developed sufficiently to meet the stringent filtration and air flow requirements necessary for gas and vapor respirator approval from the pertinent regulatory agency. In such packed beds, adsorbent particles are constrained in a container by compressive forces imposed on and transmitted through the particle bed by rigid grids and screens which cover the inlet and outlet areas. Virtually all such packed bed filters are cylindrical, have constant thickness or bed depth and have a planar inlet and outlet. The adsorbent particles are filled layerwise by pouring through screens. The screens scatter the particles as they fall resulting in a level filled bed packed to substantially maximum density per unit volume. The compressive forces applied by the constraining grids and screens restrain particle movement to thereby minimize flow channeling within the packed bed.

Although gas and vapor respirators with packed bed filter elements satisfy the necessary performance parameters, the very nature of the packed beds has imposed severe constraints on overall respirator design. Thus, their cylindrical geometry dictates incorporating the filter element as an appendage (external cartridge) on the respirator which results in some interference with vision and an increase in the number of respirator parts. Another problem encountered with packed beds for use in a volume sensitive product such as a respirator is that the retaining grids and screens themselves add to the total volume and consequently add bulk to the filter element. A still further problem is experienced when a packed bed respirator is combined in series with a particulate filter for use in environments containing particulates as well as vapor hazards such as in paint spray applications. In this situation, the retaining grids and screens create nonuniform airflow pathways within the particulate filter resulting in reduced utilization of the filter media and increased pressure drop therethrough.

Adsorbent loaded nonwoven structures such as described in U.S. Pat. No. 3,971,373 contain adsorbent particles in the interstices between the fibers forming the nonwoven web. Such structures permit the manufacture of conformable shaped respirators thus overcoming the design restrictions imposed by the geometry of packed bed adsorbent structures. However, the high density of adsorbent particles achieved in the packed bed structures is lost in the adsorbent loaded nonwoven structures because the fibers themselves act as spacers between the adsorbent particles. This low adsorbent density makes it difficult, if not impossible, to achieve the filtration requirements for approvable respirators since it is difficult to pack sufficient adsorbent particles into the small available volume of a respirator. Another form of adsorbent loaded nonwoven structure is adsorbent paper where adsorbent particles are incorporated in the spaces between the paper fibers; these adsorbent papers are also lower density structures.

Open celled loaded foam structures containing adsorbent particles dispersed within and bonded in the foam structure have been developed for various uses, e.g., as an adsorbent composite for evaporative emission control for automobiles (U.S. Pat. No. 3,813,347), a carbon impregnated foam particularly suited for protective clothing against noxious chemicals in liquid or vapor form (U.S. Pat. No. 4,046,939) and an impregnated foam sheet deodorizer insole (U.S. Pat. Re. No. 29,501). Most of the loaded foam structures also suffer the limited density disadvantage of the loaded nonwoven structures thus limiting their use in respirators.

Bonded adsorbent structures have been utilized as liquid filters for many years. While these structures have had the potential for the high adsorbent densities needed for respirators and other critical air filter uses, that potential has not been recognized and exploited.

The known bonded adsorbent structures can be subdivided into two major classifications, viz., those in which the contaminant must first pass through a polymeric binder coating surrounding the adsorbent particle before it is adsorbed by the particle and those where the contaminant encounters the adsorbent particle through uncoated areas on the adsorbent surface.

Examples of bonded adsorbent structures where the adsorbent particles are coated by a polymeric binder are U.S. Pat. No. 3,091,550 directed to semi-rigid materials having a bonded adsorbent coating thereon and U.S. Pat. No. 4,386,947 directed to apparatus for adsorbing fuel vapor in an internal combustion engine wherein the vapor adsorbent is preferably formed from layers of molded monolithic honeycombed activated carbon bodies.

The second type of bonded adsorbent structures, where portions of the adsorbent particle surface are exposed, is exemplified by U.S. Pat. Nos. 3,217,715; 3,353,544; 3,354,886; 3,375,933; 3,474,600; 3,544,507; 3,645,072; 3,721,072; 3,919,369; 4,061,807 and 3,538,020. Of the myriad of intended applications for these bonded adsorbent structures, only U.S. Pat. No. 3,544,507 suggests, in passing, that the agglomerated carbon particles produced could be used as gas mask filters, presumably as a packed bed cartridge. U.S. Pat. No. 3,538,020 is directed to bonded adsorbent bodies comprised of fluid treating aggregate particles such as ion exchange resins, activated charcoal, manganese greensand, sawdust and like materials bound together in closely packed abutting relationship in a matrix of a polymeric material such as polyurethane, the aggregate particles being spaced essentially as they would be in a packed bed. It is, however, expected that a significant portion of the interstitial volume will be occupied by the binder matrix with a resultant increase in pressure drop in the bonded structures. Since no respirator use is suggested in the patent, any possible respirator use to be inferred for such structures would be as substitutes for packed bed filter cartridges. While this patent and a number of the above noted patents state that the bonded adsorbent structures could be molded into any desired shape, most of the shapes exemplified are flat or cylindrical bodies. U.S. Pat. No. 3,721,072 does disclose a differently shaped filter comprising activated carbon granules bonded together into a monolithic extended surface shape in the form of a wave, the filter being particularly useful in air handling systems according to the patentee.

The fact remains that none of the patents specifically addresses respirator applications nor provides any basis for concluding that such bonded adsorbent structures could be used as the filter elements in respirators where high dynamic capacity and high efficiency contaminant removal with low pressure drops and uniform air flow are essential characteristics.

SUMMARY OF THE INVENTION

The present invention lies in porous bonded adsorbent structures particularly suited for filtration of gases and vapors and respirators incorporating such structures as the active gas and vapor filtration elements. These respirators provide respiratory protection for workers in environments containing hazardous gases and vapors. The bonded adsorbent structures are made by combining adsorbent granules and polymeric binder particles by controlled compaction into porous unitary structures of uniform and controlled density and air permeability throughout resulting in uniform low pressure drop and air flow across the entire structure.

DETAILED DESCRIPTION OF THE INVENTION

Figures 1, 2, 3:
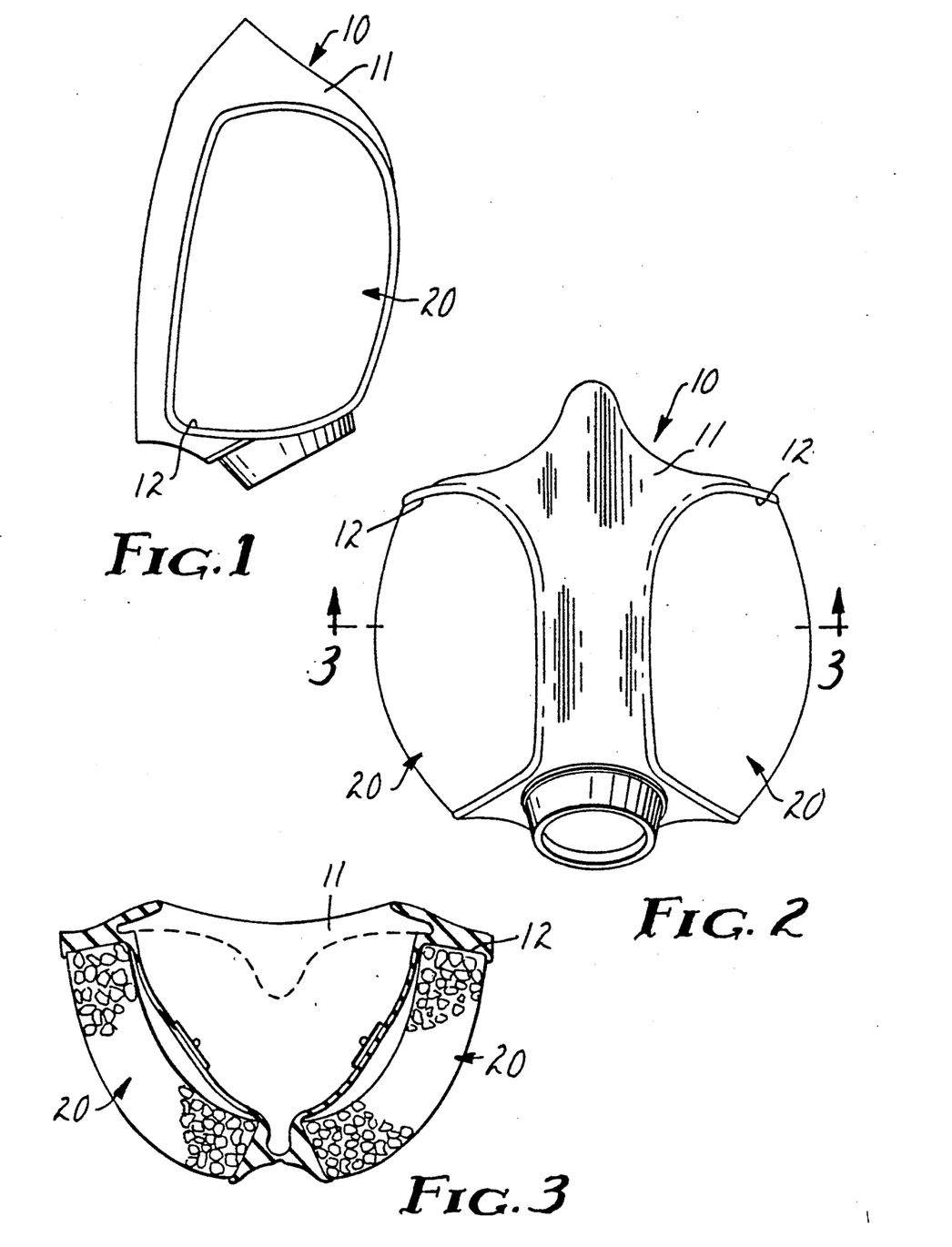
FIG. 1 is a side elevational view of one form of respirator with molded bonded adsorbent filtration elements.
FIG. 2 is a front elevational view of the respirator of FIG. 1.
FIG. 3 is a sectional view along the lines 3—3 of FIG. 2.

Referring now more particularly to the drawings, FIGS. 1 to 3 show a half-mask respirator 10 (covering the nose and mouth and sealing beneath the chin) with large area bonded adsorbent filtration elements 20 occupying a major portion of the surface area of the respirator 10. As will be especially evident from FIG. 3, the bonded adsorbent filtration elements 20 are incorporated directly into the elastomeric facepiece 11 of respirator 10. Edge seals 12 between the bonded adsorbent filtration element 20 and the elastomeric facepiece 11 are made with a suitable adhesive material such as a hot melt adhesive, hot melt foam adhesive or a latex adhesive. Adhesives which contain solvents other than water should be avoided. Respirator 10, as shown, is otherwise conventional and will not be further described herein. It is to be understood, of course, that the bonded adsorbent structures of the present invention are equally useful in the myriad other respirators which utilize loose packed bed cartridges, canisters and filter elements. Exemplary of such other respirators are gas masks and powered air purifying respirators.

The bonded adsorbent structures of the present invention are produced by first evenly and uniformly mixing and blending adsorbent granules 21 and binder particles 22 and compacting and heat bonding the mixture to form porous unitary structures 20 of controlled uniform density. Useful adsorbent granules can have a variety of shapes ranging from near spherical to elongated granules having aspect ratios of length to diameter of from 1 to 20.

Figure 4:
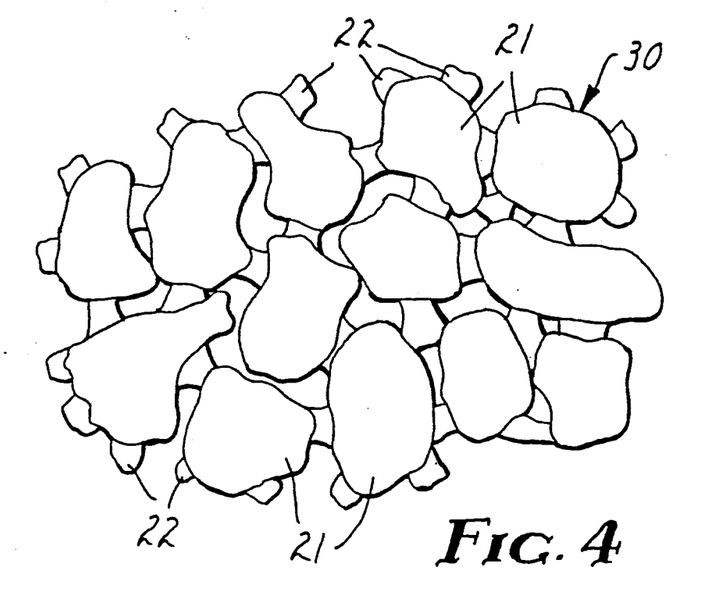
FIG. 4 is an illustrative and greatly enlarged fragmentary view of the bonded adsorbent body of the present invention shown before compaction.

An even and uniform distribution of binder particles 22 on the surface of the adsorbent granules 21, as illustrated in FIG. 4, is essential and agglomeration of the binder particles 22 should be avoided for optimum results. The adsorbent granules and the binder particles can be dry blended, particularly with smaller binder particles in the range of 200 mesh (U.S. Standard sieve) and finer, where the attractive forces of the particles to the granules exceed those forces which tend to detach the particles from the granules. Where larger binder particles are used or where the attractive forces are weak, wet mixing is used to uniformly mix and blend the adsorbent granules and the binder particles. Microscopic examination of several portions of the mixed batch, dry or wet, is useful to verify that mixing is uniform and the binder particles are evenly distributed about the adsorbent granules and have not significantly agglomerated.

FIG. 4 illustrates a condition during the bonding process where the binder particles 22 have joined the adsorbent granules 21. The adsorbent granules are spaced apart by the binder particles and may be compressed to positions of higher density and lower permeability depending on pressing conditions and degree of compaction.

Binder materials which have been found useful in the present invention include thermoplastic and thermosetting materials. However, since not all such materials are satisfactory binders, the following tests were devised to screen candidate binder materials.

TEST 1: POLYMER BINDER MELT TEST

This test determines the suitability of polymer binder materials by their softening, melting and flow behavior. Thermosetting binders melt at a relatively low temperature, build viscosity (by crosslinking), become firm while hot and solidify upon cooling. Thermoplastic binders soften when heated, melt and lose viscosity with increasing temperatures.

In order to qualify as a useful binder for the present invention where it is essential to have an open porous structure with the adsorbent granule surfaces substantially uncovered by binder material, the binder must wet but not flow out over the test surface when the binder is heated to its processing temperature. Binder materials which flow out over the test surface tend to have sharp melting points and/or low melt viscosities. Useful binder materials are those which melt or soften and resist flow out over a relatively large temperature range, i.e., they do not have sharp melting points or they have high melt viscosities. The wetting and flowout properties of a polymer binder can be determined by measuring the contact angle of the binder on a test surface. During processing, the contact angle for successful binder materials should be between 45° and 135°, preferably between 75° and 105°. These contact angles indicate sufficient wetting properties without excessive flow out.

For the test surface, a heated stage with a flat surface is used. The surface energy of the stage surface should match the surface energy of the adsorbent granule to assure replication of the wetting properties of the binder material.

Temperature readings are taken when the binder particles begin to exhibit surface tension smoothening, $T_1$; when surface tension effects draw the particle into a smoothly curved droplet on the heated surface, $T_2$; and when the binder material flows out as a film on the heated surface, $T_3$. The ideal binder processing temperature for making bonded adsorbent structures of the present invention is $T_2$. Useful processing temperature ranges among polymer binders can be found anywhere between $T_1$ and $T_3$; however, in general, most polymer binders will be found to have good bonding characteristics within the desired contact angles at processing temperatures from $T_2$ to about midway between $T_2$ and $T_3$. The most useful ranges for different polymer binders can be empirically determined by this test and the tests subsequently described herein, i.e., the pick and coupon tests.

TEST 2: PICK TEST

This test is designed to measure bond strength. A standard adsorbent, viz., Witco activated carbon 950 (Witco Chemical Corp.) 18×40 mesh is used. The test binder material, in particle form, is heated to its flow-out temperature, $T_3$, and allowed to spread into a film to a depth about equal to the diameter of the original binder particles. After the polymer temperature has been adjusted to $T_2$, a quantity of standard adsorbent granules are lightly pressed into the surface of the hot binder film (using a heat-resistant glove). The test piece is then cooled to room temperature. A needle or small laboratory spatula is used to break the adsorbent granules loose from the binder film by prying beneath the granule edges.

If the granules break away cleanly leaving substantially no residue in the binder film, failure is interfacial and insufficient bond strength between the adsorbent and the test binder material is indicated.

If portions of the adsorbent granules remain in the binder film, this indicates cohesive failure within the adsorbent granule and indicates adequate bond strength.

If portions of the binder material are found to adhere to the adsorbent granules, this indicates cohesive failure of the binder material and further testing is necessary.

TEST 3: COUPON TEST

This test is especially useful when cohesive failure of the binder material occurs, when chemical or other reactions between the adsorbent granules and binder material detrimental to good adhesion are suspected, or when a different non-standard adsorbent is to be used. The coupon is prepared by uniformly mixing and blending the test ingredients followed by compacting and heat bonding of the mixture into a convenient size for measuring the desired properties.

Uniform mixtures of adsorbent granules and binder particles, either dry mixed or stabilized with water, can be transformed into bonded adsorbent structures of the present invention by several means.

Figure 5:
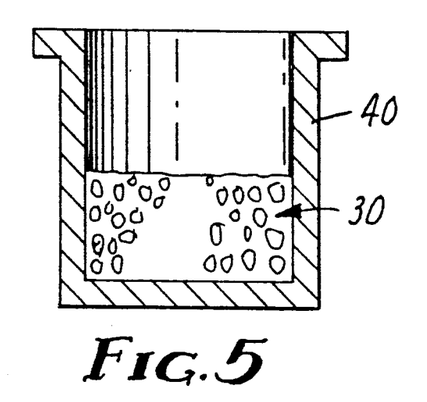
FIGS. 5 through 10 are simplified diagrammatic sectional views of typical molds immediately before and during compaction.
Figure 6:
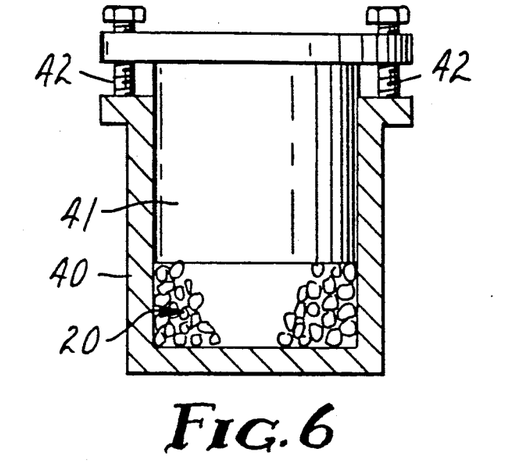

Referring to the drawings, FIGS. 5 and 6 show molds for producing bonded adsorbent structures 20 of cylindrical geometry. A measured quantity of mixed adsorbent granules and binder particles 30 is charged into the cavity of a mold 40 and heated to its processing temperature $T_2$. Some care must be exercised in the heating step particularly if the binder material has a narrow processing temperature range as determined in the Polymer Binder Melt Test. Upon attainment of the proper processing temperature, the heated mixture is pressed by piston 41 to a predetermined thickness provided through adjustable stops 42. After cooling, the bonded adsorbent structure 20 is removed from the mold. Alternatively, the structure 20 can be removed while warm. In this case, care must be exercised to avoid deforming the structure 20. Teflon or other release agent coated molds have been found useful in easing removal of structures 20 from the mold.

A more rapid molding process can be accomplished by separately heating a blended mixture of adsorbent granules and binder particles and transferring a measured quantity of said mixture into the mold cavity from a transfer mold (not shown) and pressing the mixture to a predetermined thickness with piston 41, as previously described. In this process, the mold is at room temperature or at its equilibrium operating temperature or can be cooled by external means. The time required for removal of the bonded structure from the mold is considerably shortened.

Figure 7:
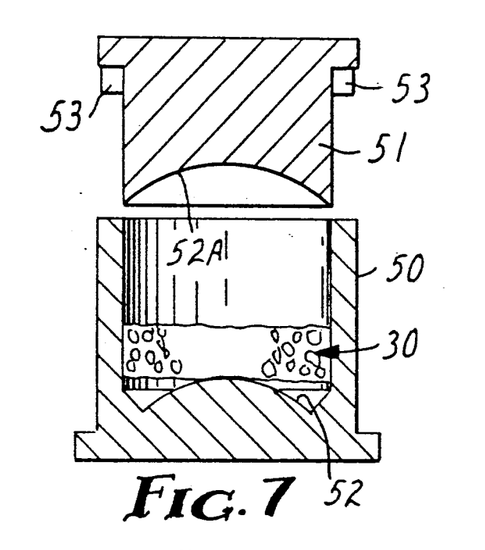
Figure 8:
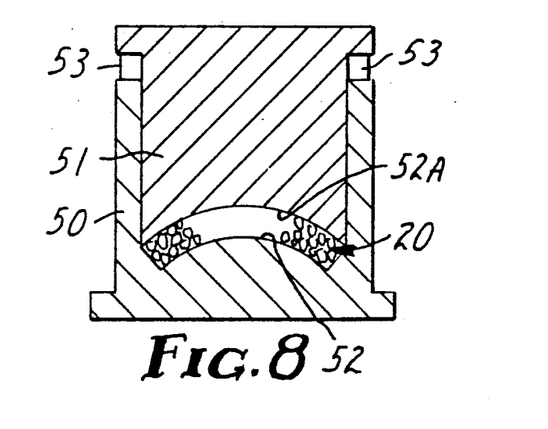

FIGS. 7 and 8 illustrate molds used for forming bonded adsorbent structures 20 of compound curved geometry such as shown in FIGS. 1 to 3. A measured quantity of a heated mixture of adsorbent granules and binder particles 30 is transferred into the cavity of mold 50 from a transfer mold (not shown). Piston 51, having a curved concave face 52A is then advanced into the mold 50 to a depth predetermined by stops 53 to form, in conjunction with convex face 52, a curved bonded adsorbent structure 20 of predetermined constant thickness. Adjustments in the density of the structure 20 formed in this procedure are preferably made by varying the amount of the mixture 30 charged to the mold and not by adjusting piston travel. Molded structures 20 can be removed from the mold while still warm but it is important that they be placed into shape matching nests so as to maintain the correct curvature until they cool.

In the molding procedures hereinabove described, careful attention must be paid to the deformation and flow of the heated mixture of adsorbent granules and binder particles. It is especially important to minimize radial shifts of the heated mixture during the molding process since uniform air flow throughout the entire bonded adsorbent structure is critical in respirator applications. Radial shift is the bulk movement of the mixture in a radial direction. Radial shift is substantially avoided in the molds shown in FIGS. 5 and 6 where the compression is totally in the axial direction. While there may be some radial shifting of the heated mixture in the molds shown in FIGS. 7 and 8, the shift is minimal and does not deleteriously affect the uniformity of the molded structure. For extremely critical curved structures, the heated mixture can be preshaped before being charged to the mold so as to avoid radial shift.

Figure 9:
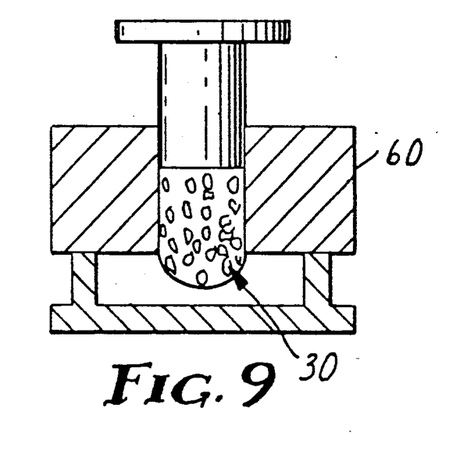
Figure 10:
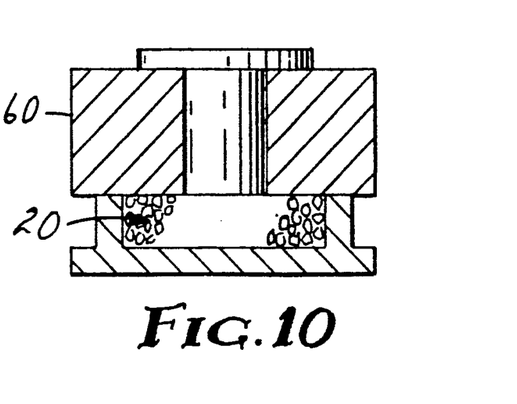

Molds 60 illustrated in FIGS. 9 and 10 which involve gross radial shifts of the mixture 30 must be avoided in the manufacture of bonded adsorbent structures for use in respirators and other dynamic applications. The resulting structures have an extreme density gradient from high in the center to low around the edges with corresponding variable air flows and pressure drops.

It has long been recognized that approval from the pertinent government regulatory agency is necessary for a respirator to be commercially viable. For the United States, the applicable regulations are contained in Subpart L of Part 11 of Subchapter B of Chapter 1, Title 30, Code of Federal Regulations, Federal Register, July 1, 1984 (hereinafter referred to as 30 CFR Part 11, Subpart and Section or USA). Similar regulations have been issued by other countries. The West German regulations are widely followed in Western Europe and an applicable German regulation for respirators is DIN 3181, Part I (hereinafter referred to as DIN).

Figure 11:
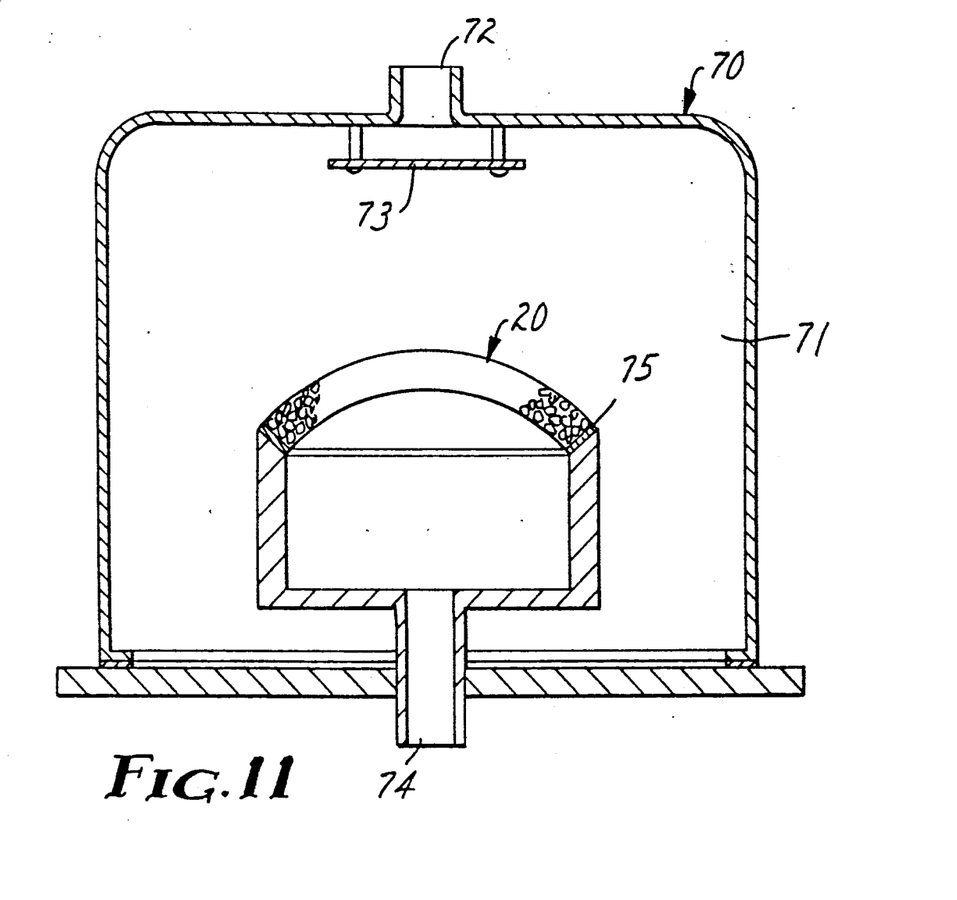
FIG. 11 is a diagrammatic sectional view of a test apparatus for measuring dynamic filtration characteristics of the bonded adsorbent structures of the present invention.

A bench test for filter cartridges for chemical cartridge respirators is set forth in 30 CFR Part 11, Subpart L, Section 11.162-8 for various gases and vapors. The apparatus illustrated in FIG. 11 was used to test bonded adsorbent structure 20 of the present invention against carbon tetrachloride (CCl4), an organic vapor. The apparatus 70 comprises a chamber 71 into which the test gas/vapor at a fixed concentration and flowrate passes through orifice 72, against baffle 73, through the test bonded adsorbent structure 20 and exits through orifice 74 to a detector (not shown) and a strip chart recorder (also not shown). Bonded adsorbent structure 20 is sealed to the test fixture with conventional modeling clay at junction points 75.

The service life of a filter element is the time of exposure to a specified constant contaminant flow required for a specified concentration of the contaminant to be detected in the effluent stream. Breathing resistance of a filter element is determined by passing a fixed flowrate of air through the filter element and measuring the pressure drop in millimeters of H2O. The requirements of the U.S. and West German government standards are set forth in Table 1 below.

As a further clarification of the relationship between service life and packed bed or bonded adsorbent filter properties, the service life is zero at some minimum packed bed or bonded adsorbent thickness. Increases beyond this minimum thickness result in corresponding increases in service life. For flat cylindrical geometry structures where the cross-sectional area is constant, there is a linear relation between service life and increase in bed thickness beyond the minimum bed depth. For curved geometry structures, where the cross-sectional area normal to the flow direction change as bed depth is added to the minimum bed depth, there is a more complex relationship between service life and bed depth or thickness.

TABLE 1

(Government Requirements for Dynamic Adsorption Capacity (Service Life) and Breathing Resistance for Gas and Vapor)

| | Filter Elements | |
|---|---|---|
| Requirements | USA | DIN |
| Flowrate (lpm) | 64 | 30 |
| Test gas | CCl4 | CCl4 |
| Test gas concentration (ppm) | 1000 | 1000 |
| Relative humidity (%) | 50 | 75 |
| Temperature (°C.) | 25 | 20 |
| Breakthrough Concentration (ppm) | 5 | 10 |
| Service Life (min.) | 50 | 80 |
| Inhalation Breathing | | |

TABLE 1-continued (Government Requirements for Dynamic Adsorption Capacity (Service Life) and Breathing Resistance for Gas and Vapor)

| | Filter Elements | |
|---|---|---|
| Resistance (mm H2O) | | |
| 30 lpm | — | 10.25 |
| 95 lpm | — | 41 |
| 85 lpm | 40 | — |

30 CFR Part 11, Subpart L, Section 11.162-8(b) provides that where two filter elements are used in parallel, the test requirements will apply to the filter elements in combination.

Unless otherwise stated bonded adsorbent structures in two configurations were tested according to one of the regimes set forth in Table 1. Configuration 1 was a shaped body as shown in FIGS. 1 to 3 with a volume of 140 cc, an outer surface area of 90 cm$^2$, an inner surface area of 45 cm$^2$ and a thickness of 1.9 cm. Configuration 2 was a portion of a spherical shell with an outer radius of 6.5 cm and an inner radius of 4.6 cm. The shaped body was obtained by taking that part of the shell subtended by a 2.14 steradian solid angle (as measured from the center of the sphere). The shaped body had a volume of 126 cc, an outer surface area of 90 cm$^2$, an inner surface area of 45 cm$^2$, and a thickness of 1.9 cm.

The present invention will be better understood by the following illustrative examples wherein the reported particle sizes of the polymer binder particles are actual particle size distributions determined by one of the following two classification methods. The first method utilized a Model B RoTap Testing Sieve Shaker, manufactured by Tyler Industrial Products. The procedure utilizes a set of six U.S. Standard sieves, arranged in a stack in descending mesh size order. Sieve sizes used for classification of polymer binder samples ranged from 35 mesh to 400 mesh. In a specific classification run, a sieve set consisting of 50, 100, 140, 200, 325 and 400 mesh sieves was used. The 50 mesh sieve was charged with 100 grams of sample polymer binder particles, placed on the stack in the Sieve Shaker and the Shaker was run for 10 minutes. Each sieve was weighed to determine the amount of polymer particles retained on the sieve. The polymer binder particle size is then expressed as the smallest range of sieve sizes beginning with the coarsest sieve in which at least 85% by weight of the particles are classified. Thus, a reported particle size of 100×325 mesh means that all particles pass through the 100 mesh sieve and at least 85% of the polymer particles have a size within the stated range.

A second method was used for classifying polymer binder particles which were too fine (smaller than 400 mesh) for classification by the Sieve Shaker method. In this second method, the test polymer binder particles were air dispersed onto a microscope slide and, if necessary further dispersed in oil with a refractive index of 1.632. Two slides of each sample material were prepared in the foregoing manner and a total of 10 photomicrographs were taken of each sample polymer. From the photomicrographs, at least 400 particles were counted, measured and tabulated into a histogram. The reported particle size distribution is the smallest subdivision of the histogram beginning with 400 mesh and containing at least 85% of the counted particles. Accordingly, a reported particle size of 625×5000 mesh (2.5–20 μm) means that 85% of the particles have diameters within the stated range.

EXAMPLE 1

A batch of adsorbent granules and polymer binder particles was prepared by dry mixing 82 weight percent of Witco activated carbon 950, 18×40 mesh (Witco Chemical Corp.) with 18 weight percent nylon-11 powder NCA 1535 ECK, 140×400 mesh (Polymer Corp.). Mixing was accomplished in a one gallon jar by rotating the jar about its long axis at 80 rpm for 10 minutes. 14.63 grams of this mixture was packed into each of several aluminum tubes of 4.76 cm internal diameter. After bringing the tubes and their contents to a temperature of 205° C., the tubes were cooled to room temperature. The structures exhibited good strength and were tested under carbon tetrachloride challenge as follows.

A 1000 ppm challenge of carbon tetrachloride flowing at 8.0 liters per minute was passed through each of the two bonded adsorbent structures. The service life of one sample to 5 ppm breakthrough was 70 minutes and the pressure drop was 7.4 mmH$_2$O. The service life and pressure drop of the other sample was 72 minutes and 6.4 mm H$_2$O.

It should be noted that although the test flowrate was only 12.5 percent of the USA requirement of 64 lpm, the face area of the sample was also about 12.5 percent of the face areas of a range of competitive packed bed respirators.

EXAMPLE 2

A batch of adsorbent granules and polymer binder particles was prepared by dry mixing, per Example 1, 82 weight percent of Witco activated carbon 950, 18×40 mesh with 18 weight percent nylon-11 powder NCA 1535 SGJ 100×400 mesh (Polymer Corp.). Prior to mixing, the nylon powder was passed through a 200 mesh screen to yield a 200×400 mesh size distribution.

The mixture was bonded at 205° C. into a dome shaped respirator filter element weighing about 130 grams. The dome was hemispherical and had an outside diameter of 12.06 cm, a wall thickness of 1.59 cm, and an inside diameter of 8.88 cm. This hemisphere was sealed to a flat plate having a central orifice and tested as follows.

A test challenge according to USA requirements of 64 liters per minute of 1000 ppm carbon tetrachloride in air was passed through the structure flowing from minutes compared to a test requirement of 50 minutes. The pressure drop was under 10 mm H$_2$O compared to a test requirement of 40 mm H$_2$O measured at 85 liters per minute.

EXAMPLE 3

A mixture of activated carbon granules and polymer binder particles was prepared according to Example 2. 24.4 grams of this mixture was placed into each of three glass tubes of 2.50 cm internal diameter and was retained in the tubes by friction fitted copper screens placed perpendicular to the tube axis. The tubes were labeled 1, 2, and 3. Into each of three other tubes (Nos. 4, 5, and 6) was placed 20.0 grams of Witco 950 18×40 mesh activated carbon with no binder. The carbon was similarly retained and was shaken and packed to maximum density.

After heating tubes 1, 2, and 3 in a 210° C. isothermal box, made of 0.32 cm thick copper, for 10 minutes, the pressure drop characteristics of all six tubes were compared. The contents of tubes 1, 2, and 3 had a very low pressure drop of only about 10 percent of the others. Tubes 1, 2, and 3 were then reheated and hot compacted with moderate hand applied pressure. The thus packed lengths were measured and were found to be essentially equal to the packed lengths of tubes 4, 5, and 6.

All six tubes were subjected to a challenge of 3000 ppm carbon tetrachloride in air flowing at 10 liters per minute. The service life to 1.0 percent (30 ppm) breakthrough was measured. Results are shown in Table 2.

TABLE 2

Bonded and Unbonded Adsorbents Exposed to 3000 ppm CCl$_4$

| Tube No. | Packed Length (cm) | Pressure Drop (mmH$_2$O) | Service Life (min.) |
|---|---|---|---|
| 1 | 9 | 274 | 39.5 |
| 2 | 9 | 251 | 40.5 |
| 3 | 9 | 213 | 41.0 |
| 4 | 8.9 | 203 | 49.0 |
| 5 | 9.2 | 178 | 51.0 |
| 6 | 9.0 | 206 | 48.5 |

EXAMPLE 4

A dry mix of 80 weight percent 18×40 mesh activated carbon granules (Witco 950) and 20 weight percent 40×200 mesh polyurethane particles (Quinn P-3429) was prepared. After a few minutes of mechanical mixing, it was apparent that the two materials were not mixing intimately. To achieve the necessary mixing uniformity, 46 weight percent (of the mixture) of water was added. Mechanical mixing was continued for a few minutes resulting in a very even, intimate mix.

Three increments, labeled A, B and C, of approximately 29 grams each were then placed in metal tubes as described in Example 1. These tubes were placed in a 210° C. oven until the material reached 210° C. as determined by a temperature probe in the material. The tubes were then taken out of the oven, the contents pressed uniformly with a cylindrical piston at 5 psi, and then cooled.

In order to test these bonded structures side by side with loose packed beds containing the same carbon and carbon weight, tubes, labeled A', B', C' and D', having an internal diameter of 4.66 cm were packed by passing 18×40 carbon granules through a 0.5 m long cylinder with coarse screens at the top and bottom to insure maximum packing density.

The test conditions, based on a 30 lpm flowrate through 70 cm$^2$ face area, were 7.3 lpm flowrate, 1000 ppm CCl$_4$ test gas, 13% RH, and 23° C. air. The test was run until 10 ppm was detected in the effluent. The results are shown in Table 3.

TABLE 3

Results of dynamic adsorption testing, bonded vs. loose packed bed

| | Polyurethane Bonded Carbon | | | Loose Packed Bed | | | |
|---|---|---|---|---|---|---|---|
| | A | B | C | A' | B' | C' | D' |
| Carbon weight (grams) | 11.42 | 12.41 | 12.44 | 11.42 | 11.83 | 12.51 | 12.43 |
| Service Life (min.) | 72 | 66 | 92 | 70 | 82 | 87 | 80 |
| Average service life ± S.D. (min.) | 76 ± 13 | | | 80 + 7 | | | |

EXAMPLE 5

Molds illustrated in FIGS. 7 and 8 were used to make Configuration 1 filter elements 20 shown in FIGS. 1 to 3. The two bonded adsorbent filters are mirror images of each other and were made as described below.

Activated carbon (18×40 mesh Witco 950), polyurethane (40×200 mesh Quinn P-3429), and water were mixed per Example 4. Each filter element contained approximately 77 grams of carbon and polyurethane, which when put into a 140 cc mold results in a bulk density of 0.55 g/cc. Increments of the mixture were individually weighed, placed in a transfer mold, heated to 195° C., extruded from the transfer mold into the Configuration 1 mold, and pressed with approximately 200 psi, as shown in FIG. 8. Although the mold was cold, which allowed for quick cycle times, care was taken when removing the filter element after pressing. It is recommended that a nesting surface matching the top or bottom surface of the bonded element be provided for the carbon element to rest on until it cools to below 60° C.

The respirator filter elements made were then tested in pairs (parallel flow) for dynamic adsorption capacity and breathing resistance per USA and DIN standards. The results of those tests are shown in Table 4 and it is observed that all samples passed the respective DIN and USA requirements for service life and pressure drop.

TABLE 4

Results of USA and DIN Testing

|   | Bonded element weights-individually and together (g) | Test | Service Life (min.) | Pressure Drop (mm H$_2$O) | |
|---|---|---|---|---|---|
| 1 | 76.85; 76.37 153.82 | DIN | 127 | 6.0 @30 lpm | 20.2 @95 lpm |
| 2 | 76.20; 76.37 152.57 | DIN | 127 | 5.6 @30 lpm | 19.2 @95 lpm |
| 3 | 76.25; 76.56 152.81 | DIN | 156 | 5.4 @30 lpm | 18.6 @95 lpm |
| 4 | 76.95; 77.0 153.95 | DIN | 163 | 6.0 @30 lpm | 20.0 @95 lpm |
| 5 | 77.19; 77.37 154.56 | USA | 68 | 17.2 @85 lpm | |
| 6 | 77.61; 77.50 155.11 | USA | 79 | 20.4 @85 lpm | |
| 7 | 77.21; 77.22 154.43 | USA | 78 | 19.4 @85 lpm | |

EXAMPLE 6

A wide range of adsorbent granule sizes were made into bonded structures according to the process of Example 5. Samples made included 4×10, 8×16, 18×40, and 30×80 mesh granular activated carbon mixed in a ratio of 80 weight percent carbon to 20 weight percent polyurethane particles. In these specific samples the ratio between largest carbon granule diameter and smallest polyurethane particle diameter was approximately 16 and the ratio between smallest carbon granule diameter and largest polyurethane particle diameter was approximately 1.2. Many other size and weight ratios are possible but these samples offered good strength, service life, and density control.

The samples made were in the spherical shell geometry (Configuration 2). The bonded elements were tested at 32 lpm, 1000 ppm CCl$_4$, 50% RH air, and 23° C. until 5 ppm CCl$_4$ in the effluent was detected.

In this example and others to follow, the test parameters may vary from example to example. To standardize the data, examples which contain service life and/or pressure drop data may have columns of service lives and pressure drops normalized to a standard test. The standard test used for normalization is two Configuration 2 filter elements tested in parallel against the USA standard. Thus, the normalized columns represent data for two filter elements in the USA test.

TABLE 5

Carbon granule size versus filtration performance

| Carbon density (g/cc) | Polymer Mesh Size* (U.S. Standard) | Carbon Mesh Size (U.S. Standard) | Service Life** (min.) | Pressure Drop @85 lpm (mmH$_2$O) | Normalized Pressure Drop (mmH$_2$O) |
|---|---|---|---|---|---|
| 0.42 | 14 × 50 | 4 × 10 | 0 | 3 | 1.5 |
| 0.39 | 20 × 80 | 8 × 16 | 40 | 16 | 8 |
| 0.44 | 40 × 200 | 18 × 40 | 88 | 56 | 28 |
| 0.44 | 100 × 325 | 30 × 80 | 111 | 130 | 65 |

*Not classified per Sieve Shaker method.
**Service life was not normalized since test was run with one element at 32 lpm.

As can be seen from the data in Table 5, structures with large carbon granules have short service lives and structures with small carbon granules have excessive pressure drops. For these reasons, it will be evident that bonded adsorbent structures should utilize carbon granules having an average size distribution between the limits of 6 and 50 mesh.

EXAMPLE 7

Configuration 2 bonded adsorbents were made using the procedure described in Example 5. All samples contained 80 weight percent 18×40 mesh activated carbon granules (Witco 950) and 20 weight percent polyurethane particles (Quinn P-3429) of varying sizes.

The samples were tested according to the USA test conditions, with the results shown in Table 6. It should be noted that only one Configuration 2 filter element (volume = 126 cc) was tested. This essentially represents half of a dual element bonded adsorbent respirator, so the test pressure drops will be higher and the test service life times lower than the dual element respirator by roughly a factor of two, as indicated in the normalized columns.

TABLE 6

Results showing effect of polymer particle size on service life and pressure drop

| Carbon density (g/cc) | Polymer Mesh Size (U.S. Standard) | Carbon Mesh Size (U.S. Standard) | Service Life (min.) | Normalized Service Life (min.) | Pressure drop @85 lpm (mmH$_2$O) | Normalized Pressure Drop (mmH$_2$O) |
| --- | --- | --- | --- | --- | --- | --- |
| 0.42 | 40 × 200 | 18 × 40 | 35 | 70 | 29 | 15 |
| 0.41 | 40 × 200 | 18 × 40 | 34 33 ± 3 | 68 65 ± 6 | 32 31 ± 2 | 16 16 ± 1 |
| 0.41 | 40 × 200 | 18 × 40 | 29 | 58 | 32 | 16 |
| 0.41 | 200 × 400 | 18 × 40 | 37 | 74 | 35 | 18 |
| 0.41 | 200 × 400 | 18 × 40 | 35 36 ± 1 | 70 72 ± 2 | 34 35 ± 1 | 17 18 ± 1 |
| 0.41 | 200 × 400 | 18 × 40 | 36 | 72 | 36 | 18 |
| 0.41 | 400 × 2500 | 18 × 40 | 23 | 46 | 26 | 13 |
| 0.41 | 400 × 2500 | 18 × 40 | 20 21 ± 2 | 40 42 ± 4 | 28 26 ± 2 | 14 13 ± 1 |
| 0.41 | 400 × 2500 | 18 × 40 | 20 | 40 | 25 | 13 |

There are two effects noticed in the table. The first and most pronounced is that service life drops significantly when the polymer particle size is less than 400 mesh. A possible explanation for this effect is the coating of the carbon granule with polymer, thereby reducing access to the interior of the carbon granule. The second effect is that pressure drops are lower when the polymer size is less than 400 mesh. This is not a marked effect as the average values, plus or minus their standard deviations, nearly overlap. If the fine particles combine with the carbon granules in such a way that the total carbon/polymer external surface area is less than with the larger particles, lower drag forces will result and hence lower pressure drops. The service life effect is the more decisive and the results therefore indicate that polymer mesh size distribution should be kept between 40 and 400 mesh.

EXAMPLE 8

Eight polymer resins were subjected to the screening tests as follows.

Polymers which passed the Polymer Binder Melt and Pick Tests were made into mixtures of 20 weight percent polymer particles and 80 weight percent 18×40 mesh activated carbon granules (Witco 950). Water was added in the cases where dry mixing did not result in a uniform mixture. Coupons were then made from the different mixtures, allowed to cool to room temperature and then examined qualitatively for bond strength. One of the polymers which showed good melting behavior and bond strength in the Polymer Binder Melt Test and the Pick Test failed the Coupon Test. In this instance, it is believed that a chemical reaction took place during the heating process which altered the polymer and consequently its bond strength.

In summary, of the eight polymers screened, two were eliminated due to failure of the Pick Test, one was eliminated due to poor melt behavior and one was eliminated in the Coupon Test. The remaining four polymers were formulated into mixtures and molded as described in Example 6. These were then tested according to the conditions set forth in Example 6 with results shown in Table 7 along with the results of the screening tests.

TABLE 7

Results of polymer binder screening tests

| Polymer | Polymer Mesh Size (U.S. Standard) | Test Failed | Service* Life (min.) | Pressure Drop @85 lpm (mmH$_2$O) | Normalized Pressure Drop (mmH$_2$O) |
| --- | --- | --- | --- | --- | --- |
| Michigan Chrome & Chemical Black Micron 455-304-0 | 40 × 200 | Pick | — | — | — |
| THERMOCLAD Vinyl SC1-EV | 50 × 200 | Pick | — | — | — |
| 3M SCOTCHCAST 265 (epoxy) | 200 × 400** | Melt | — | — | — |
| DuPont HYTREL 7246 (polyester) | 35 × 140 | Coupon | — | — | — |
| B. F. Goodrich 5713 rubber & Heinkle 6204 nylon in 50:50 weight mixture | 50 × 200 | none | 62 | 38 | 19 |
| U.S. Industrial FN524 (low density polyethylene) | 400 × 5000 | none | 45 | 43 | 22 |
| U.S. Industrial FE532 (ethylene-vinyl acetate copolymer) | 1250 × 5000 | none | 55 | 52 | 26 |
| Quinn P-3429 (polyurethane) | 40 × 200 | none | 66 | 24 | 12 |

*Service life was not normalized since test was run with one element at 32 lpm.
**23.4% of material passed through the 400 mesh sieve while 88.9% passed through the 200 mesh sieve.

EXAMPLE 9

A batch of 80 weight percent 18×40 mesh activated carbon granules (Witco 950) and 20 weight percent 40×200 mesh polyurethane particles (Quinn P-3429) was prepared as described in Example 5. The mold of FIGS. 7 and 8 was used for preparing Configuration 2 bonded adsorbent samples that varied in carbon density from 0.35 g/cc to 0.47 g/cc. This was accomplished by varying the amount of mixture charged to the mold. These samples were processed as described in Example 5 and tested according to the USA standards. Only one Configuration 2 element was tested against the USA standard so the pressure drops will be higher and the service life times lower by roughly a factor of two. The results of these tests with normalized service lives and pressure drops are shown in Table 8.

TABLE 8

Carbon density versus filtration performance

| Total Weight (g) | Carbon Density (g/cc) | Service Life (min.) | Normalized Service Life (min.) | Pressure Drop @85 lpm (mmH$_2$O) | Normalized Pressure Drop (mmH$_2$O) |
| --- | --- | --- | --- | --- | --- |
| 55.16 | 0.35 | 17 | 34 | 14 | 7 |
| 54.16 | 0.35 | 19 17 ± 2 | 38 35 ± 3 | 15 15 ± 1 | 8 8 ± 1 |
| 55.00 | 0.35 | 16 | 32 | 15 | 8 |
| 61.32 | 0.39 | 26 25 ± 1 | 52 50 ± 3 | 22 23 ± 1 | 11 12 ± 1 |
| 61.80 | 0.39 | 24 | 48 | 23 | 12 |
| 68.48 | 0.43 | 31 | 62 | 56 | 28 |
| 68.41 | 0.43 | 39 36 ± 5 | 78 73 ± 9 | 60 61 ± 6 | 30 31 ± 3 |
| 68.32 | 0.43 | 39 | 78 | 68 | 34 |
| 73.90 | 0.47 | 39 | 78 | 82 | 41 |
| 74.59 | 0.47 | 45 42 ± 3 | 90 85 ± 6 | 94 85 ± 8 | 47 42 ± 4 |
| 74.29 | 0.47 | 43 | 86 | 78 | 39 |

Examination of Table 8 will show that a wide range of carbon densities are possible while still offering reasonable filtration performance. This is, of course, not true for loose packed beds which are always packed or loaded to a maximum density for a given adsorbent. The apparent density (as determined by ASTMD-2854-70) of the carbon used in this example is 0.44 g/cc; thus, it is seen that bonded adsorbents offer carbon densities well below and above the apparent density of the carbon when loose packed according to ASTMD-2854-70. Aside from offering great latitude in the manufacture of bonded adsorbent filters, density control offers more versatility in filter design.

While the low and the high density values in Table 8 do not literally meet the USA standards for a half mask respirator, it should be possible, as the values are close to those required, to make geometric adjustments to the bonded element to bring these values within the USA requirements.

EXAMPLE 10

To best utilize the adsorption capacity of activated carbons, it is very desirable to have uniform air flow across the entire cross-sectional face of the filter. If the flow is not uniform across the surface normal to the flow direction, then that area of the surface which has a higher flow velocity (lower pressure drop) will begin to break through first. A great deal of effort has been put into eliminating this problem for loose packed beds resulting in specific ways to pack the beds to maximum packing density.

In this example, bonded adsorbents are compared with conventional commercially available loose packed beds for uniformity of airflow.

The loose packed bed was a 3M EASI AIR #7251 cannister with a 7.3 cm diameter and a height of 2.4 cm. Carbon from one of the EASI AIR cannisters was removed and used to make a bonded adsorbent filter under the process conditions of Example 4. The bonded filter was processed in a mold as shown in FIGS. 5 and 6, the final dimensions being a height of 2.6 cm and a diameter of 7.3 cm.

A hot wire anemometer, T.S.I. Model No. 1650 (Thermo Systems Inc.) was used to test the uniformity of flow across the surface. The circular filters were placed between two 10 cm long cylinders with 7.3 cm diameters. The edges were sealed with modeling clay and eight equally spaced holes were bored around the perimeter just above the surface of the filter to allow access for the hot wire anemometer probe. The cylinders were used to provide a plenum for the effluent and to reduce edge effects on the influent side of the filter. An airflow of 85 lpm was passed through the filters, during which time the velocity was measured at nine positions, eight equally spaced around the perimeter (0.7 cm from the edge) and one at the center of each filter. As a test standard a 0.64 cm thick, 7.3 cm diameter piece of 3M Grade 175 TEGRAGLASS was used. TEGRAGLASS is a very uniform porous body comprised of uniform glass spheres bonded together in a fashion very similar to hexagonal close packed bodies.

The results of the velocity measurements for each of the test samples were as follows:

a) TEGRAGLASS—66 cm/s at each of the nine positions.
b) Bonded adsorbent of the present invention—66 cm/s at 0°, 45°, 90°, 135°, 225° positions; 61 cm/s at center and 180° positions and 71 cm/s at the 315° position.
c) Loose packed bed—61 cm/s at 0°, 45°, 90°, 180°, 225° and 315° positions; 66 cm/s at 135° and 270° positions and 56 cm/s at the center position.

It will be observed that the uniformity of air flow across the entire face of the bonded adsorbent structure of the present invention is substantially uniform and is at least equivalent to the air flow characteristics of the loose packed bed structure presently used in respirators.

EXAMPLE 11

Six batches of Witco 18×40 mesh 950 carbon and 40×200 mesh Quinn P-3429 polyurethane were mixed per Example 4 with carbon amounts ranging from 60 to 85 weight percent. Three samples from each of the six batches were made using the spherical shell mold (Configuration 2) and then tested per the USA standards. Only one Configuration 2 element was tested so the pressure drops will be higher and the service life times lower by roughly a factor of two. The results of these tests with normalized service lives and pressure drops are shown in Table 9.

TABLE 9

Polymer binder content versus filtration performance

| Total Weight (g) | Carbon Density (g/cc) | Polymer Content (%) | Service Life (min.) | Normalized Service Life (min.) | Pressure Drop @85 lpm (mmH$_2$O) | Normalized Pressure Drop (mmH$_2$O) |
| --- | --- | --- | --- | --- | --- | --- |
| 55.58 | 0.38 | 15 | 35 | 70 | 19 | 10 |
| 55.72 | 0.38 | 15 | 33 34 ± 1 | 66 67 ± 2 | 21 20 ± 1 | 11 11 ± 1 |

TABLE 9-continued

Polymer binder content versus filtration performance

| Total Weight (g) | Carbon Density (g/cc) | Polymer Content (%) | Service Life (min.) | Normalized Service Life (min.) | Pressure Drop @85 lpm (mmH$_2$O) | Normalized Pressure Drop (mmH$_2$O) |
|---|---|---|---|---|---|---|
| 55.81 | 0.38 | 15 | 33 | 66 | 21 | 11 |
| 59.22 | 0.38 | 20 | 30 | 60 | 22 | 11 |
| 59.34 | 0.38 | 20 | 30 30 ± 1 | 60 59 ± 1 | 23 22 ± 1 | 12 11 ± 1 |
| 59.11 | 0.38 | 20 | 29 | 58 | 22 | 11 |
| 64.07 | 0.38 | 25 | 28 | 56 | 28 | 14 |
| 64.11 | 0.38 | 25 | 32 29 ± 3 | 64 58 ± 5 | 31 30 ± 2 | 16 15 ± 1 |
| 63.74 | 0.38 | 25 | 27 | 54 | 32 | 16 |
| 68.23 | 0.38 | 30 | 23 | 46 | 30 | 15 |
| 68.22 | 0.38 | 30 | 22 23 ± 1 | 44 45 ± 1 | 31 30 ± 1 | 16 15 ± 1 |
| 68.17 | 0.38 | 30 | 23 | 46 | 30 | 15 |
| 73.57 | 0.38 | 35 | 26 23 ± 4 | 52 46 ± 8 | 68 63 ± 7 | 34 32 ± 4 |
| 73.87 | 0.38 | 35 | 20 | 40 | 58 | 29 |
| 79.43 | 0.38 | 40 | 19 | 38 | 92 | 46 |
| 79.20 | 0.38 | 40 | 18 17 ± 2 | 36 35 ± 4 | 90 87 ± 6 | 45 44 ± 3 |
| 79.46 | 0.38 | 40 | 15 | 30 | 80 | 40 |

The results show that polymer contents of 30 percent or more are deleterious to filter service life or pressure drop. The high pressure drops and reduced service lives at these percent levels are generally unacceptable in half mask respirators, but may be useful where strength is the most critical design parameter such as in powered air purifying respirators.

EXAMPLE 12

Ten polymers were mixed with witco 950 18×40 mesh activated carbon in a ratio of 80 weight percent carbon to 20 weight percent polymer. Water was added to those mixtures that did not mechanically mix in the dry state. From these mixtures cylindrical bonded adsorbent bodies (diameter=9.1 cm, height=1.9 cm) were made using the mold illustrated in FIGS. 5 and 6.

A typical concern with presently available packed bed cartridge respirators is that rough usage and handling conditions may lead to channeling of flow in the loose packed bed. Since the bonded adsorbent structure of the present invention is a unitary structure, channeling is not a problem. However, cracking or breaking of the bonded filter element under rough handling or usage conditions may be encountered. For this reason, the bonded adsorbent bodies were tested for impact resistance in the following manner.

The cylindrical bonded adsorbent bodies were dropped from two heights onto a concrete floor. The surface normal to the cylinder axis was held so that it was parallel to the floor and then released from rest. Those bonded structures which did not break in the drop test were tested for dynamic adsorption capacity according to the USA standards. The dynamic adsorption test was run for 10 minutes; if the effluent airstream did not reach breakthrough concentration (i.e., 5 ppm CCl$_4$), it was considered undamaged by the impact test. The results of these tests are given in Tables 10 and 11. Table 10 gives the results of the impact test for a height of 2.5 m and Table 11 for a height of 3 m; separate structures were used for each test.

TABLE 10

Results of 2.5 meter impact test

| Polymer | Weight (g) | Polymer Mesh Size (U.S. Standard) | # times dropped | Result | Dynamic adsorption Test (min.) | Pressure drop @85 lpm (mmH$_2$O) |
|---|---|---|---|---|---|---|
| Polymer Corp. PCA-1544A-ECH (polyester) | 63.86 | 100 × 325 | 1 | B* | — | — |
| Quinn P-3429 (polyurethane) | 62.00 | 40 × 200 | 5 | ND** | 10 | 25.0 |
| Quinn P-455 (polyurethane) | 63.40 | 50 × 200 | 5 | ND | 10 | 24.6 |
| Polymer Corp. NCA 77 (nylon-11) | 64.29 | 50 × 325 | 1 | B | — | — |
| Polymer Corp. NCA 1535 SGJ (nylon-11) | 61.03 | 100 × 400 | 2 | B | — | — |
| U.S. Industrial FE532 (ethylene-vinyl acetate copolymer) | 61.81 | 1250 × 5000 | 5 | ND | 10 | 26.4 |
| U.S. Industrial FN524 (LDPE) | 61.11 | 400 × 5000 | 5 | ND | 10 | 37.6 |
| B. F. Goodrich 5713 rubber and Heinkle 6204 nylon in 50:50 weight mixture | 62.70 | 50 × 200 | 5 | ND | 10 | 23.6 |
| Eastman FA252 (polyester) | 63.48 | 50 × 400 | 5 | ND | 10 | 22.0 |
| U.S. Industrial FN510 (LDPE) | 63.67 | 400 × 2500 | 5 | ND | 10 | 32.8 |

*B — Broke into discrete pieces
**ND — no visible damage

TABLE 11

Results of 3 meter impact test

| Polymer | Weight (g) | Polymer Mesh Size (U.S. Standard) | # times dropped | Result | Dynamic adsorption Test (min.) | Pressure drop @85 lpm (mmH$_2$O) |
|---|---|---|---|---|---|---|
| Polymer Corp. PCA-1544A-ECH (polyester) | 63.86 | 100 × 325 | 2 | B | — | — |
| Quinn P-3429 (polyurethane) | 62.12 | 40 × 200 | 5 | ND | 10 | 26.6 |

TABLE 11-continued

| | Results of 3 meter impact test | | | | Dynamic adsorption Test (min.) | Pressure drop @85 lpm (mmH$_2$O) |
|---|---|---|---|---|---|---|
| Polymer | Weight (g) | Polymer Mesh Size (U.S. Standard) | # times dropped | Result | | |
| Quinn P-455 (polyurethane) | 63.40 | 50 × 200 | 5 | ND | 10 | 24.5 |
| Polymer Corp. NCA 77 (nylon-11) | 64.19 | 50 × 325 | 2 | B | — | — |
| Polymer Corp. NCA 1535 SGJ (nylon-11) | 62.36 | 100 × 400 | 1 | B | — | — |
| U.S. Industrial FE532 (ethylene-vinyl acetate copolymer) | 61.92 | 1250 × 5000 | 5 | ND | 10 | 27.0 |
| U.S. Industrial FN524 (LDPE) | 60.85 | 400 × 5000 | 5 | B | — | — |
| B. F. Goodrich 5713 rubber and Heinkle 6204 nylon in 50:50 weight mixture | 62.70 | 50 × 200 | 5 | ND | 10 | 31.6 |
| Eastman FA252 (polyester) | 61.09 | 50 × 400 | 5 | B | — | — |
| U.S. Industrial FN510 (LDPE) | 63.54 | 400 × 2500 | 4 | B | — | — |

Of the possible results of the test, i.e., breaking into discrete parts, visible cracking and no visible damage, only the first and third results were observed as indicated in the results column of the Tables. The impact resistance data provide a very useful parameter for proper polymer selection. It has been determined that structures which passed the 2.5 m impact test were satisfactory structures for respirator uses.

EXAMPLE 13

The lacquer and enamel mist test aerosols described in 30 CFR Part 11, Subpart L, Sections 11.162-4, 5, and 6 were prepared and passed through bonded adsorbent filters fitted with paint spray prefilters as described below. The lacquer used was a 50/50 volume mixture of DAYCO brushing lacquer No. 5004 and DAYCO lacquer thinner, both available from James B. Day and Co. The enamel used was 50 volume parts of gum spirits turpentine from AMSCO Division, Union Oil Co. of California, and 50 volume parts of "QUICK DRY" enamel No. 54-352 from PPG Industries, Inc., and Resins Divisions.

The bonded adsorbent elements were each spherical segments of 0.84 cm thickness, outside radius 6.50 cm, inside radius 5.66 cm; the portion of the shell used being subtended by a 2.14 steradian solid angle. The composition of the bonded adsorbent structures was prepared according to Example 4. Across the outer surface (90 cm$^2$) of each of the two elements used in the enamel test was fitted a paint spray prefilter of relatively coarse nonwoven felt material. The paint spray prefilter used for the lacquer tests was a portion of a 3M No. 8718 prefilter web sufficient to cover the 90 cm$^2$ surface.

The elements used were similar in size (except thinner in thickness) to elements used for left or right respirator elements. Since only one element was used the 32 lpm flow requirement was reduced to 16 lpm. Both tests were run for the required 2 hours and 36 minutes and the bonded adsorbent elements were then examined visually and subjected to the shock test of Example 12 and were found to have suffered no apparent deterioration in physical properties. Air flow through the paint spray prefilter web was uniform as evidenced by the smooth deposition of paint spray particles over the entire prefilter surface.

EXAMPLE 14

It has been noted earlier that the service life of a filter element is the time of exposure to a specified constant contaminant flow required for a specified concentration of the contaminant to be detected in the effluent stream. The thickness or depth of a filter element of a given cross-sectional area is, of course, the major determinant of the volume of the filter element. At a certain bed depth, a respirator filter element will have a service life of zero minutes where there is immediate detection of the contaminant. This is the minimum bed depth for a filter element. Increases in thickness or bed depth beyond this minimum thickness will result in corresponding increases in volume of the filter element and, therefore, service life.

The minimum bed depth for a bonded adsorbent structure of the present invention was determined using a standard 100 ppm iso-amyl acetate test atmosphere. Iso-amyl acetate was selected because it is known to have dynamic filtration characteristics similar to carbon tetrachloride and because low concentrations have a distinct banana-like odor. Bonded adsorbent structures having a diameter of 7.31 cm were fitted to the right side of a 3M EASI-AIR respirator No. 7300. The left side was fitted with a standard packed bed respirator cartridge (3M cartridge No. 7251). With the right side blocked off, the test subjects each verified a non-leaking face seal. Then with the left side blocked off, the subjects were able to breathe through the bonded adsorbent structures alone. Results for cylindrical bonded adsorbent structures made according to the composition and processing conditions of Example 5 are presented in Table 12.

TABLE 12

Minimum Bed Depth Determinations At Human Respiration Flow Rates

| BONDED ADSORBENT DESCRIPTION | | ODOR DETECTION | |
|---|---|---|---|
| No. | Weight (grams) | Thickness (cm) | Normal Breathing | Heavy Breathing |
| 1 | 14.58 | 0.66 | None | Slight |
| 2 | 14.50 | 0.66 | None | Slight |
| 3 | 21.74 | 0.98 | None | None |
| 4 | 21.56 | 0.98 | None | None |

It will be observed that the 0.66 cm filters had a thickness at about the minimum bed depth while the thicker, 0.98 cm, filters had a thickness exceeding the minimum bed depth for a range of breathing flow rates. Effective filter elements of 7.31 cm diameter must, therefore, have a thickness greater than 0.66 mm.

EXAMPLE 15

This example illustrates the relationship between density and permeability for bonded adsorbents and establishes permeability criteria for application in respirator design.

Eighteen bonded adsorbent structures were made according to the process outlined in Example 4. A mold as shown in FIGS. 5 and 6 was used to make cylindrical bonded adsorbent elements of 9.2 cm diameter and 1.9 cm height. Six sets of three elements per set were made by varying the weight of material charged to the mold. The edges were sealed and a flow of 42.5 lpm was passed through individual elements in an axial direction. Pressure drop measurements were used to calculate the permeability of the bonded adsorbent materials using Darcy's law and the results are given in Table 13.

TABLE 13

Air Flow Permeability vs. Density of Bonded Adsorbent Structures

| weight (grams) | bulk density (g/cc) | carbon density (g/cc) | Pressure Drop* 42.5 lpm (mm H$_2$O) | Permeability $\times 10^{-6}$ (cm$^2$) |
|---|---|---|---|---|
| 53.84 | 0.43 | 0.34 | 5.4 | 7.0 |
| 53.44 | 0.42 | 0.34 | 5.6 | 6.7 |
| 55.00 | 0.44 | 0.35 | 5.8 | 6.5 |
| 59.34 | 0.47 | 0.38 | 8.4 | 4.5 |
| 59.20 | 0.47 | 0.38 | 7.8 | 4.8 |
| 58.76 | 0.47 | 0.38 | 9.2 | 4.1 |
| 62.98 | 0.50 | 0.40 | 15.2 | 2.5 |
| 62.80 | 0.50 | 0.40 | 11.8 | 3.2 |
| 62.61 | 0.50 | 0.40 | 13.2 | 2.9 |
| 66.76 | 0.53 | 0.42 | 17.0 | 2.2 |
| 66.59 | 0.53 | 0.42 | 17.6 | 2.1 |
| 66.42 | 0.53 | 0.42 | 15.6 | 2.4 |
| 70.70 | 0.56 | 0.45 | 34.8 | 1.1 |
| 70.36 | 0.56 | 0.45 | 25.2 | 1.5 |
| 70.62 | 0.56 | 0.45 | 29.2 | 1.3 |
| 74.26 | 0.59 | 0.47 | 42.6 | 0.9 |
| 74.22 | 0.59 | 0.47 | 29.8 | 1.3 |
| 75.26 | 0.60 | 0.48 | 62 | 0.7 |

*Pressure drop was not normalized since test was run with one element at 42.5 lpm Based on a half mask respirator and using the USA criteria of a 40 mm H$_2$O inhalation breathing resistance at 85 lpm, it is clear that two of the cylindrical bonded adsorbent structures of this example with 42.5 lpm flowing through each should have a permeability limit of about $1.0 \times 10^{-6}$ cm$^2$ or about 100 Darcys. (1 Darcy = $9.87 \times 10^{-9}$ cm$^2$).

Configuration 1 bonded adsorbent structures were also made matching the highest carbon density of Table 8 and were tested at 42.5 lpm. The pressure drop information indicated a permeability limit of about $1.0 \times 10^{-6}$ cm$^2$. The similar permeability limits which resulted for Configuration 1 structures compared to the cylindrical structures of this example indicate approximately equal flow resistance for the two structures in spite of their dissimilar geometry.

EXAMPLE 16

To demonstrate the feasibility of using bonded adsorbent filters in powered air purifiers, 400 grams of 8×16 mesh activated carbon granules (Witco 965) and 100 grams of 40×200 mesh polyurethane particles (Quinn P-3429) were mixed with 250 grams of water per Example 4. The mixture was then charged to a rectangular prism mold, heated to 195° C., and then pressed into a final shape having dimensions of 17 cm×17 cm×3 cm. The resulting bonded adsorbent filter was then tested by replacing the loose packed bed filter element in a NIOSH approved commercially available powered air purifier (POWERED AIR PURIFIER, Model W-2801, 3M Company) with the bonded adsorbent rectangular filter.

A bench test for canisters and cartridges for powered air-purifying respirators is set forth in 30 CFR Part 11, Subpart M, Section 11.183-7. The bench test specifies carbon tetrachloride at a concentration of 1000 ppm, a flow rate of 170 lpm, relative humidity of 50+5% at room temperature (25°±5° C.). Minimum service life is 50 minutes, determined when the effluent concentration reaches 5 ppm. Maximum allowable resistance (pressure drop) of the powered air-purifying respirator at 85 lpm is 70 mm of water, measured after service life testing (30 CFR Part 11, Subpart M, Section 11.183-1).

The results of these tests are shown in Table 14.

TABLE 14

Results of service life and pressure drop tests

| Filter | Service Life* (min.) | Pressure Drop & 85 lpm (mm H$_2$O) |
|---|---|---|
| Bonded adsorbent | 80 | 3 |
| Loose packed bed filter | 118 | 8 |

*There appears to be some confusion in the requirement for minimum service life. As originally published in March 1972, a service life of 50 minutes was required by the applicable regulations. However, as published in July 1984, no minimum service life is designated. Currently available information is that NIOSH requires a minimum service life of 50 minutes for approval of canisters and cartridges for powered air-purifying respirators.

Examination of Table 14 will show that the bonded absorbent structure of the present invention easily meets the service life and pressure drop requirements of the applicable regulations and compares favorably with the loose packed bed filter element of the NIOSH approved commercial powered air-purifying respirators. Also, as earlier noted, the service life can be controlled by varying the quantity and/or density of the carbon granules in the bonded adsorbent structure.

We claim:

1. A respirator comprising:
   a facepiece adapted for peripheral sealing contact with at least that portion of a human head which includes the nose and mouth;
   associated fastening means for holding said respirator in position on the head; and
   at least one porous filtering structure having a panel-like shape, mounted in the respirator across a path for air to be drawn or blown inwardly through the respirator, the filtering structure;
   having two opposed large-area surfaces with dimensions larger than the structure's thickness;
   being a unified and impact-resistant structure;
   said filtering structure comprising spaced individual adsorbent granules bonded to one another by uniformly distributed, adherent binder particles disposed between said granules wherein said binder particles were in a liquefied state during bonding of the structure, and at least 85 weight percent of the binder particles have diameters larger than 400 mesh.

2. A respirator of claim 1 wherein the facepiece is made of a elastomeric material.

3. A respirator of claim 1 in which the two opposed large-area surfaces of the porous filtering structure are curved.

4. A respirator of claim 1 wherein said respirator is capable of passing 85 lpm of air therethrough at a pressure drop of not over 40 mm of water.

5. A respirator of claim 1 wherein said respirator has a breakthrough time against a challenge of carbon tetrachloride vapor at a concentration of 1000 ppm at a flowrate of 64 lpm of at least 50 minutes.

6. A respirator of claim 1 wherein at least 85 weight percent of the binder particles are larger than 200 mesh.

7. A respirator of claim 1 wherein at least 85 weight percent of the binder particles have diameters in the range of 40 to 400 mesh.

8. A respirator of claim 1 wherein the binder particles are polymeric materials which achieve contact angles of 45° to 135° between the temperature whereat the binder particles begin to exhibit surface tension smoothening, and the temperature whereat the binder particles flow out as a film on a heated surface.

9. A respirator of claim 1 wherein the binder particles are selected from the group consisting of polyurethane, ethylene-vinyl acetate, and polyethylene.

10. A respirator of claim 1 wherein the adsorbent granules have an average particle size in the range of 6 to 80 mesh.

11. A respirator of claim 1 wherein the adsorbent granules have an average particle size in the range of 12 to 40 mesh.

12. A respirator of claim 1 wherein said absorbent granules and said binder particles have a size ratio in the range of 1.2 to 3.0.

13. A respirator of claim 1 in which the adsorbent granules comprise carbon.

14. A respirator of claim 1 wherein the adsorbent granules comprise carbon, the binder particles comprise polyurethane, and at least 85 weight percent of the binder particles have diameters in the range of 40 to 400 mesh.

15. A respirator of claim 1 wherein the porous filtering structure is a molded, panel-like shape comprising a mixture of said absorbent particles and said binder particles said mixture preheated until surface tension effects draw said binder particles into a smoothly curved droplet on a heated surface.

16. A respirator of claim wherein the porous filtering structure has an adsorbent density of from 80 percent to 110 percent of an equivalent loose packed bed as determined by ASTM D-2854-70.

17. A respirator of claim 1 wherein the porous filtering structure contains about 65 to 90 weight percent adsorbent granules and about 10 to 35 weight percent binder particles.

18. A respirator of claim 1 wherein the porous filtering structure contains about 80 weight percent adsorbent granules and about 20 weight percent binder particles.

19. In combination, a powered air-purifying respirator and at least one porous filtering structure having a panel-like shape adapted to be mounted across a path for air to enter the respirator, the filtering structure;
   having two opposed large-area surfaces with dimensions larger than the structure's thickness;
   being a unified and impact resistant structure;
   said filtering structure comprising spaced individual adsorbent granules bonded to one another by uniformly distributed, adherent binder particles disposed between said granules wherein said binder particles were in a liquefied state during bonding of the structure, and at least 85 weight percent of the binder particles have diameters larger than 400 mesh.

* * * * *

UNITED STATES PATENT AND TRADEMARK OFFICE
CERTIFICATE OF CORRECTION

PATENT NO. : 5,078,132
DATED : January 7, 1992
INVENTOR(S) : Braun et al.

It is certified that error appears in the above-indentified patent and that said Letters Patent is hereby corrected as shown below:

Col. 7, line 57, "Filter Elements" should be centered between the margins as it is part of the title.

Col. 8, line 5, "Filter Elements" should be centered between the margins as it is part of the title.

Col. 9, line 48, "from minutes" should be --from outside to inside. The service life was in excess of 60 minutes--.

Col. 22, line 6, "life" should be --life*--.

Col 24, line 4, " said" should be --; said--.

Col. 24, line 1, "claim" should be --claim 1--.

Signed and Sealed this

Ninth Day of May, 1995

Attest:

BRUCE LEHMAN

Attesting Officer

Commissioner of Patents and Trademarks